United States Patent [19]
Aidlin et al.

[11] Patent Number: 5,542,789
[45] Date of Patent: Aug. 6, 1996

[54] MULTI POSITION BOTTLE GUIDE ASSEMBLY

[76] Inventors: Stephen H. Aidlin, 1521 Eastbrook Dr., Sarasota, Fla. 34231; Samuel S. Aidlin, 5079 Village Garden, Sarasota, Fla. 34234; Larry Kincaid, 2635 Hyde Park St., Sarasota, Fla. 34239

[21] Appl. No.: 200,020

[22] Filed: Feb. 22, 1994

[51] Int. Cl.$^6$ ................................................ B65G 51/02
[52] U.S. Cl. ........................................ 406/88; 92/66
[58] Field of Search ................... 406/86, 88; 198/836.3; 92/66, 117 R

[56] References Cited

U.S. PATENT DOCUMENTS

| | | | |
|---|---|---|---|
| 3,647,051 | 3/1972 | Didas | 198/836.3 |
| 4,915,012 | 4/1990 | Osthus et al. | 92/66 |
| 5,161,919 | 11/1992 | Smith et al. | 406/86 |
| 5,246,314 | 9/1993 | Smith et al. | 406/86 |
| 5,304,027 | 4/1994 | La Barre et al. | 406/86 |

FOREIGN PATENT DOCUMENTS

| | | | |
|---|---|---|---|
| 149445 | 9/1983 | Japan | 92/66 |
| 405246542A | 9/1993 | Japan | 406/88 |

*Primary Examiner*—Gary C. Hoge

[57] ABSTRACT

A new and improved multi position bottle guide assembly for bottles suspended by a neck ring and conveyed by pneumatic power. The bottle guide assembly includes a pair of elongated guide rails positioned along the path of travel of a bottle which is pneumatically conveyed while supported by a neck ring. The rails are adapted to be in proximity to the sides of the bottle on opposite sides of its path of travel to preclude lateral movement. Further included are support mechanisms for the rails located at the ends of the rails. Also included are a plurality of rods for supporting the rails. Each rod has coupling mechanisms for the support mechanism at a first end and a piston at the second end. A block for each rod has a bore of a diameter essentially that of the diameter of its piston and extends through the block with its axis in alignment with the axis of the rod. Further included are a pair of axially spaced pneumatic ports extending through the block in a direction perpendicular to the axis of the bore and on opposite sides of the piston whereby when pressurized air is introduced through the port adjacent to the rail the piston moves away from the rail to accommodate larger bottles and when pressurized air is introduced into the port remote from the rail, the piston moves towards the rail to accommodate smaller bottles.

2 Claims, 7 Drawing Sheets

MULTI POSITION BOTTLE GUIDE ASSEMBLY

BACKGROUND OF THE INVENTION

1. Field of the Invention

This invention relates to a multi position bottle guide assembly and, more particularly, to pneumatically conveying plastic bottles suspended from neck rails while applying stabilizing forces to the lower portions of the bottles.

2. Description of the Background Art

Many types of plastic bottles are in wide use today throughout the carbonated beverage and other industries, in large part, because of their economical cost to manufacture. Such plastic bottles are usually formed from injection molded parisons having threaded upper necks, lower cylinders closed at the bottom, and neck support rings therebetween. The parisons are then blow molded beneath the neck support rings into the desired size and shape by heating the parisons in molds while blowing air internally.

Blow molded plastic bottles have been traditionally shaped with cylindrical side walls throughout the majority of their lower extents and with high-angle, conically-shaped, transition portions between the upper ends of the cylindrical side walls and the neck support rings. The transition portions thus functions to join the upper, small diameter, threaded portions with the lower, large diameter, side wall portions. The side walls are enlarged to any one of a plurality of standard sizes.

Plastic bottles are normally conveyed while suspended by their neck support rings from spaced parallel neck rails. The bottles are conveyed continuously, in a contiguous orientation with the cylindrical side walls of all bottles in a fed stream touching the next adjacent bottles, front and back, with long lines of contact. The motives force for conveying is supplied by a high volume, low pressure plenum chamber above the neck rails. The directional force for conveying is supplied through louvers in the plenum chamber walls. Side rails preclude lateral shifting of the bottles while being conveyed. Forward and rearward swinging of the bottles occurs to a limited extent but is not a significant problem.

It has been found, however, that conveying problems arise when plastic bottles of different sizes are conveyed by a common conveyor. Such conveying problems are due in large part to improperly located side rails. Further, the proper positioning of side rails to accommodate bottles of a next size, different from a prior size, can be a time consuming project resulting in excessive down time and unnecessary costs. When side rails are not positioned properly, misfeeds result with even more down time and greater inconvenience and cost.

Pneumatic conveying systems for plastic bottles with neck rings are in wide use today and are described in the patent literature. Note for example, U.S. Pat. Nos. 4,284,370 to Danier and 4,822,214 to Aidlin. No known pneumatic conveying system, however, has the capability to provide side rails with automatic repositioning of the side rails as a function of the size of the bottles being fed.

Therefore, it is an object of this invention to provide an improvement which overcomes the aforementioned inadequacies of the prior art devices and provides an improvement which is a significant contribution to the advancement of the pneumatic conveyors.

It is a further object of the present invention to provide a new and improved multi position bottle guide assembly for bottles suspended by a neck ring and conveyed by pneumatic power comprising a pair of elongated guide rails positioned along the path of travel of a bottle which is pneumatically conveyed while supported by a neck ring. The rails are adapted to be in proximity to the sides of the bottle on opposite sides of its path of travel to preclude lateral movement. Also included are support means for the rails located at ends of the rails. Further included are a plurality of rods for supporting the rails. Each rod has coupling means for the support means at a first end and has a piston at the second end. Also included is a block for each rod which has a bore of a diameter essentially that of the diameter of its piston and extends through the block with its axis in alignment with the axis of the rod. Further included is a pair of axially spaced pneumatic ports which extend through the block in a direction perpendicular to the axis of the bore and on opposite sides of the piston whereby when pressurized air is introduced through the port adjacent to the rail, the piston moves away from the rail to accommodate larger bottles and when pressurized air is introduced into the port remote from the rail, the piston is moved towards the rail to accommodate smaller bottles.

It is a further object of the invention to convey plastic bottles in a more efficient, reliable and rapid manner.

It is a further object of the invention to abate misfeeds of bottles conveyed by pneumatic conveyors.

It is a further object of the invention to apply a lateral stabilizing force to the lower portions of bottles of any one of a plurality of sizes being conveyed for thereby eliminating lateral swinging with attendant misfeeds.

It is a further object of the present invention to provide guide rails which are adjustable to facilitate the feeding of bottles of various sizes.

It is a further object of the invention to more efficiently convey various sized bottles.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing this invention, this invention comprises a new and improved multi position bottle guide assembly for bottles suspended by a neck ring and conveyed by pneumatic power comprising a pair of elongated guide rails which are positioned along the path of travel of a bottle which is pneumatically conveyed while supported by a neck ring. The rails are adapted to be in proximity to the sides of the bottle on opposite sides of its path of travel to preclude lateral movement. Also included are support means for the rails located at ends of the rails. Further included are a plurality of rods for supporting the rails. Each rod has coupling means for the support means at a first end and a piston at the second end. A block for each rod has a bore of a diameter essentially that of the diameter of its piston and extends through the block with its axis in alignment with the axis of its rod. Further included are a pair of axially spaced pneumatic ports which extend through the block in a direction perpendicular to the axis of the bore and on opposite sides of the piston whereby when pressurized air is introduced through the port adjacent to the rail the piston moves away from the rail to accommodate larger bottles and when pressurized air is introduced into the port remote from the rail, the piston moves towards the rail to accommodate smaller bottles. Also included are a plurality of second rods, each second rod having a fixed first end and a second piston at its second end. Further included is a second block which is coupled to the first block on the side thereof remote from the rails and having a bore of a diameter essentially that of the diameter of the second piston and extending through the block with its axis in alignment with the axis of its rod. Further included are a pair of axially spaced pneumatic ports extending through the block. At least one is in a direction perpendicular to the bore and radially with respect to the rod. The ports are on opposite sides of the piston whereby, when pressurized air is fed in through the port remote the rail, the second block moves away with respect to the fixed second end towards the rail to accommodate smaller bottles and when pneumatic air is introduced into the port adjacent to the rail, it will move the rail towards the blocks to accommodate larger bottles.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention, the new and improved multi position bottle guide assembly, is comprised of a plurality of component elements. In their broadest context, the invention includes pairs of elongated guide rails, support means for the rails, first rods for the rails having first pistons thereadjacent, a first block for each rod and piston, pneumatic ports for each first block, a plurality of second rods each with a piston, second blocks for each rod and piston and axially spaced ports for the blocks. The components are specifically configured and correlated with respect to each other so as to attain the desired objective.

Figure 1:
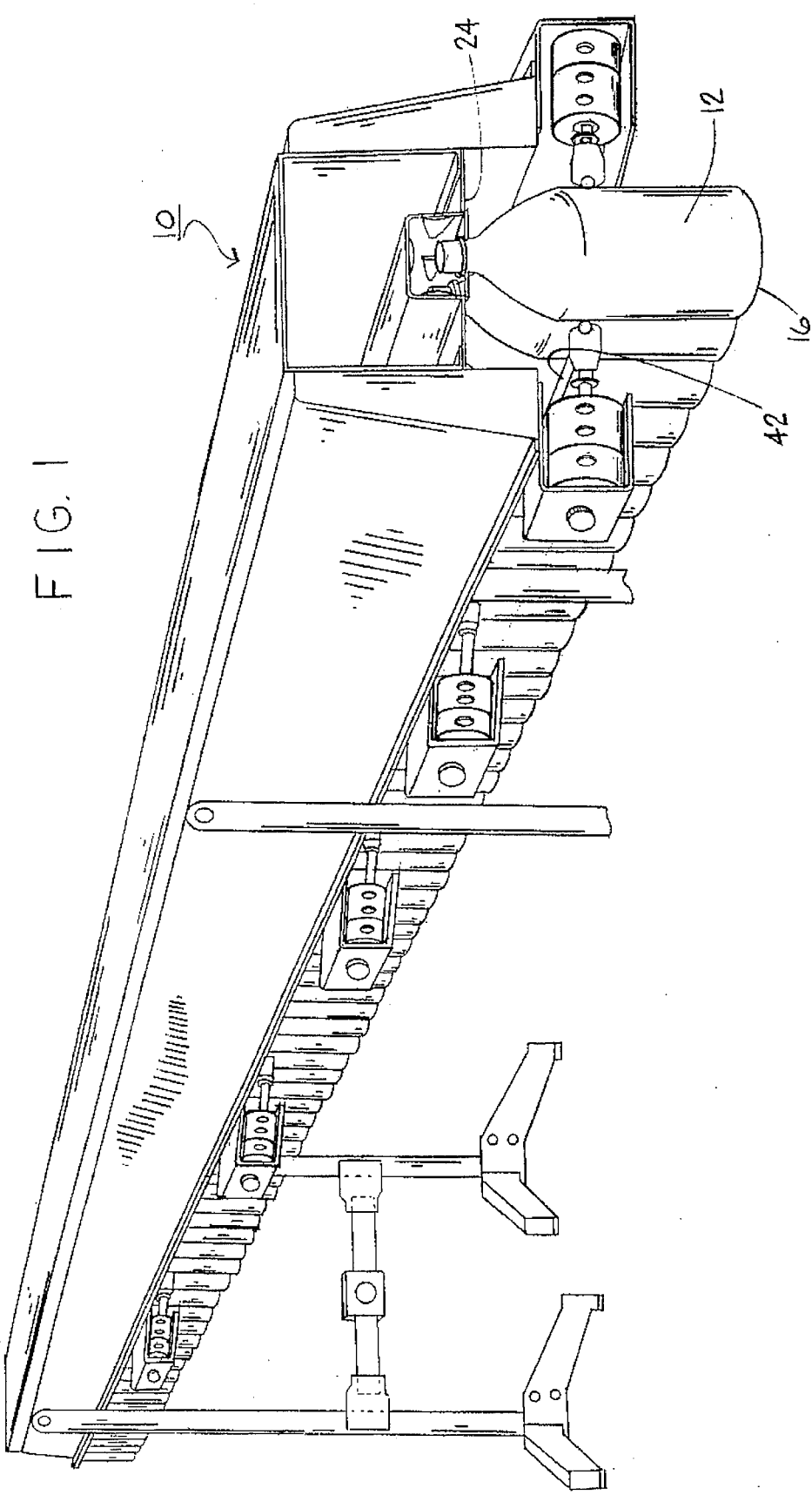
FIG. 1 is a perspective illustration of the preferred embodiment of the longitudinal extent of a conveyor constructed in accordance with the principles of the present invention.

Shown in the Figures, with particular reference to FIG. 1, there is shown an apparatus 10 for pneumatically conveying articles or plastic bottles 12. The bottles are preferably of the type having a small diameter threaded upper portion 14, a large diameter lower portion 16 and a low-angle, transition portion 18 therebetween. Further, the bottles have a neck support ring 20 between the upper portion and the transition portion.

Figure 2:
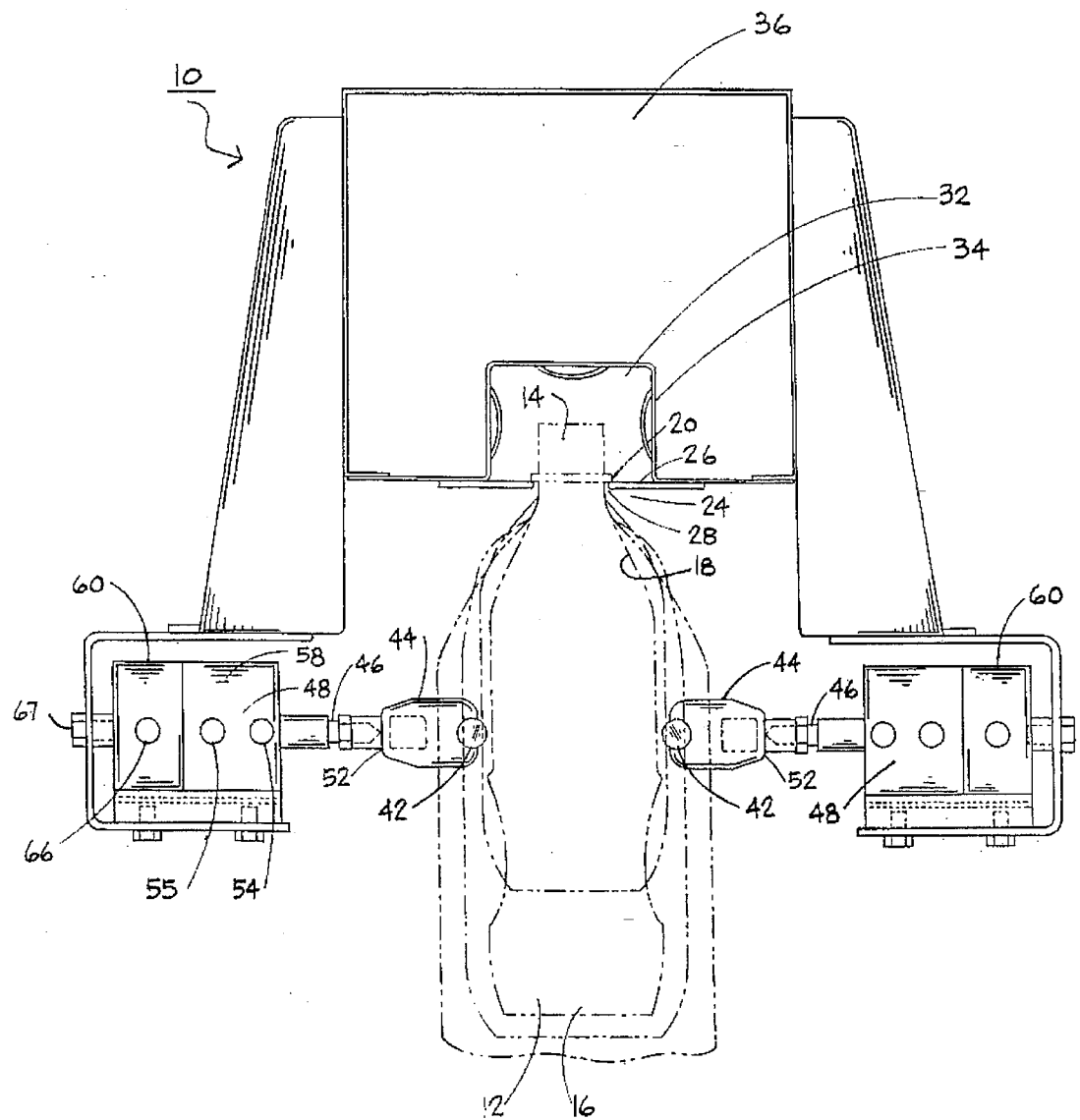
FIG. 2 is a front elevational view of the conveyor shown in FIG. 1.

The central component of the apparatus 10 is a conveyor 24 defining a path of travel along its length with means for receiving the upper portions of the article to be conveyed. Preferably, the conveyor comprises a pair of laterally spaced neck rails 26. As shown in FIGS. 1 and 2, the neck rails define the path of travel along their lengths. The neck rails have upper surfaces for receiving the neck rings of the bottles being conveyed. A space 28 between the neck rails defines an elongated slot therebetween. The slot slidably supports a bottle by its neck ring.

The apparatus further includes a plenum chamber 32. The plenum chamber is coupled to the upper surfaces of the neck rails. See FIG. 2. Further, the plenum includes directional louvers 34. In the preferred embodiment, the plenum chamber is formed of an inverted, U-shaped, interior channel member. This member extends upwardly from the neck rails and spans the slot. The member has a cross-sectional area sufficient to receive portions of the bottles above their neck rings. The interior channel member has a top wall and side walls coupled to the neck rails. Additionally, the top wall and side walls are all formed with air directing louvers formed therein as shown in FIG. 2. The air directing louvers provide a driving force for the bottles along the path of travel.

Furthermore, an inverted U-shaped, exterior channel member 36 is also coupled to the neck rails. The exterior channel member, like the interior channel member, extends upwardly from the path of travel and neck rails and encloses the interior channel member. The exterior channel member extends longitudinally the length of the slot.

A motion imparting means is provided to move the received bottles to be conveyed. Preferably, the motion imparting means is a pressure source or fan operatively coupled to the plenum chamber. When activated, air under pressure fills the plenum chamber and thereafter moves through the louvers to thereby convey the bottles which are suspended on the neck rails along the path of travel. See FIG. 1.

The apparatus further includes pairs of guide rails 42. The guide rails are positioned along the path of travel and are laterally disposed adjacent to the opposite sides of the upper extents of the bottles. As the bottles are conveyed, the guide rails preclude lateral shifting of the bottles.

More specifically, the invention includes a pair of elongated guide rails 42 which are laterally adjustable. The rails 42 are adapted to be in proximity to the sides of the bottle on opposite sides of its path of travel. They function to preclude lateral movement and are spaced for the specific size of the bottle being conveyed.

Located in association with the guide rails are support means 44. A pair of support means are provided for each rail.

They are preferably located adjacent to the ends of each rail. In addition, a pair of support means and supported rail is located on each side of the bottle for equal and opposite movement with respect to the path of travel of the bottle. Note FIG. 2.

Next provided are first rods 46. A plurality of such first rods are utilized for supporting the rails and are equal in number to the number of the support means 44. The first rods are oriented in a horizontal orientation. Each first rod has a coupling means 52 for retaining the support means at a first end and hence the supported rail. Each rod has a second end with a first piston 48 at such second end.

A first block 58 is provided for each rod and piston. Each such first block has a bore 50. Its diameter is essentially equal to that of the diameter of the piston. The piston is located within the block for axial movement with respect thereto. The bore extents through the block with its axis in alignment with the axis of the rod and piston. The rod extends through an aperture 52 in the end of the block adjacent to the support means and rails.

Formed in the first block are a pair of pneumatic ports 54 and 55. Such ports are axially spaced with respect to each other and extend through the block in a direction perpendicular to the bore and radially with respect to the rod. They are located on opposite sides of the piston. In this manner, when pressurized air is introduced through the port 54 adjacent to the rail, the piston moves away from the rail to accommodate larger bottles. When pressurized air is introduced to the port 55 remote from the rail, the piston moves towards the rail to accommodate smaller bottles.

In order to extend the utility of the adjustment mechanisms, a plurality of second rods 56 is also provided. Each such second rod has a fixed first end and a piston 59 at its second end. A second block 60 is coupled to the first block on the side of the first block remote from the rails. The second block has a bore 62 of a diameter essentially that of the diameter of the second piston. The bore extends through the block with its axis in alignment with the axis of the rod. An aperture 64 extends through the side of the second block remote from the rail for movement of the second rod therethrough.

The last component of the system are a pair of axially spaced pneumatic ports 66 and 67 extending through the second block. One of the ports 66 is in a direction perpendicular to the bore and radially with respect to the rod. The other port 67 extends through the end of the block. The ports are on opposite sides of the piston. In this manner, when pressurized air is fed through the port 67 remote from the rail, the second block moves away with respect to the second end 68 secured to a fixed support toward the rail. This is to accommodate smaller bottles. When pressurized air is introduced into the port adjacent to the rail, it will move the rail towards the blocks to accommodate larger bottles.

FIG. 2 shows, in dotted line configurations, the four sizes of bottles normally fed by a pneumatic conveyor. In FIG. 2, the guide rails are located for the feeding of the smallest of bottles.

Figure 3:
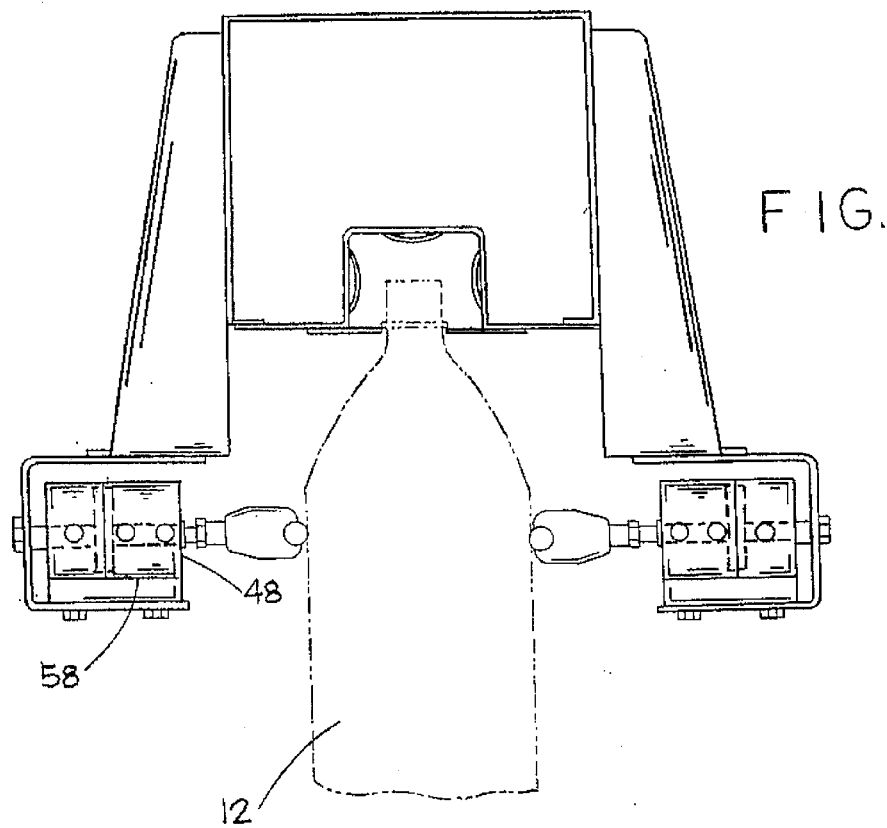
FIGS. 3, 4, 5 and 6 are end elevational views of the guide rails in any one of their four positions for accommodating bottles of different sizes.
Figure 5:
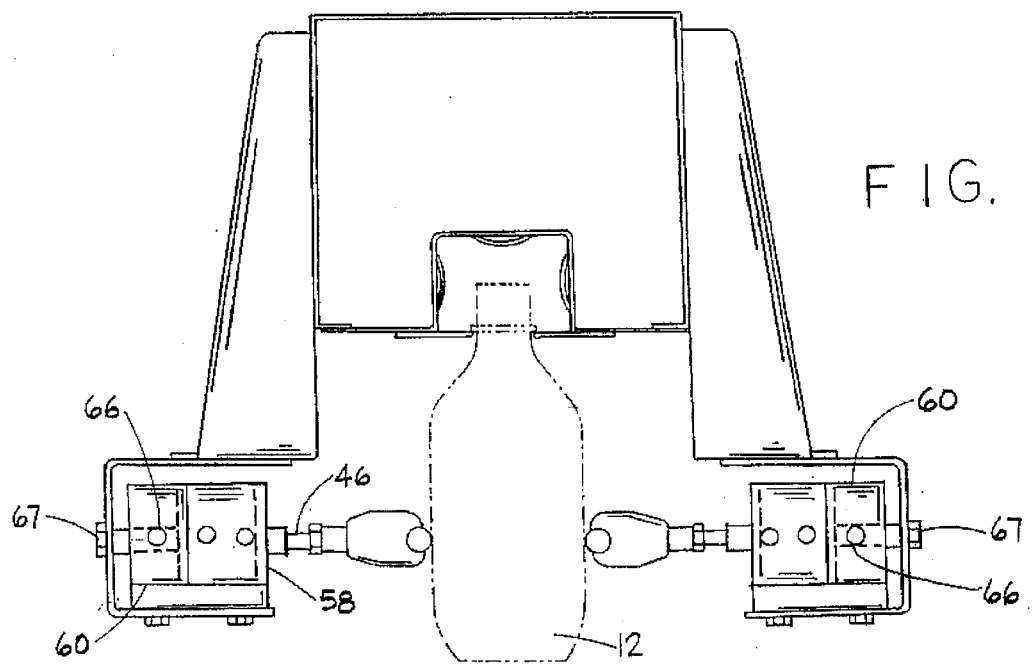
Figure 6:
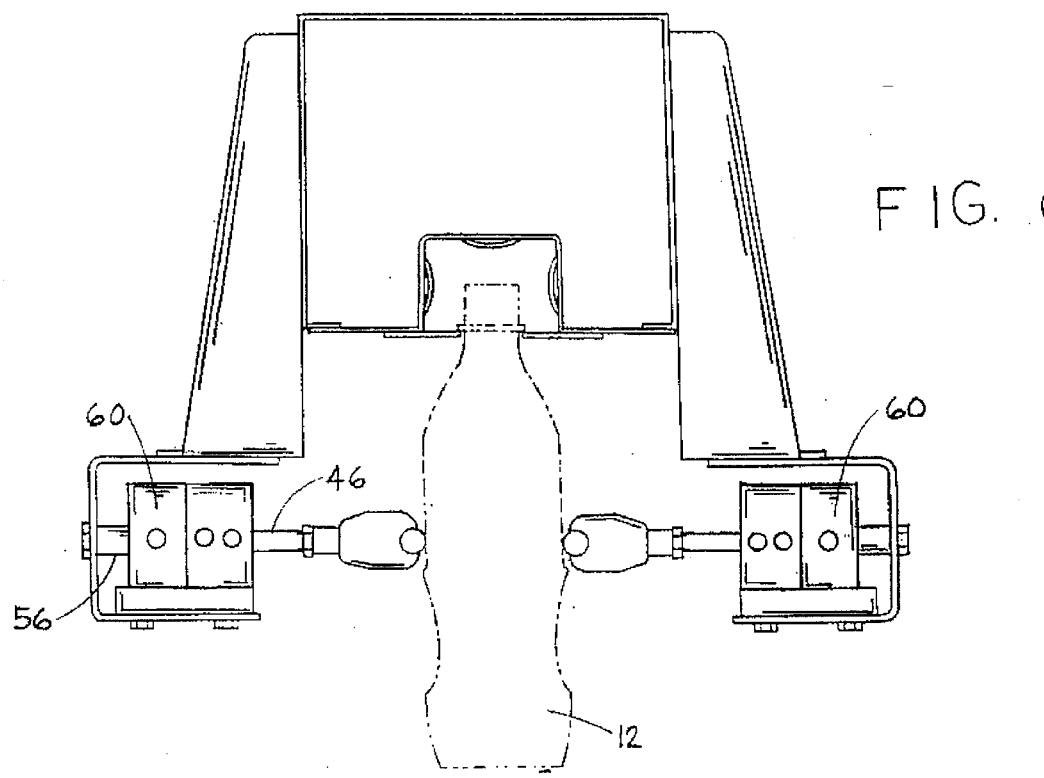
Figure 7:
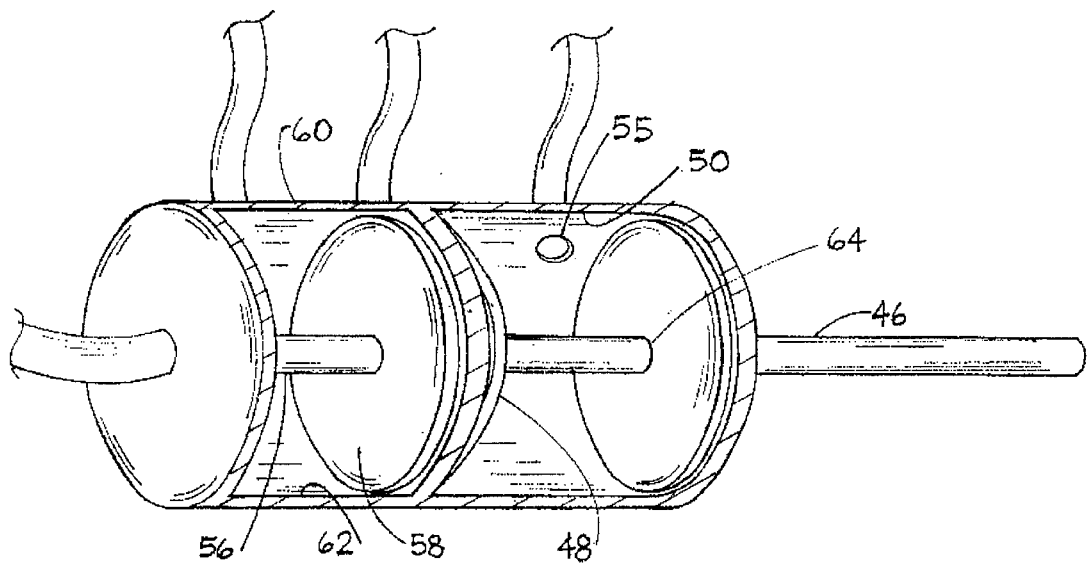
FIGS. 7, 8, 9 and 10 are cut-away views of the pistons in various orientations to accommodate the rail positions of the prior Figures.

FIGS. 3 through 6, when taken in conjunction with FIGS. 7 through 10, are further illustrations of the various settings of the side rails for the various size bottles being fed. In FIGS. 3 and 7, the largest of bottles is being conveyed. The blocks are in the retracted positions and the piston of the first block is moved away from the bottle and its path of travel. The piston orientation is best seen in FIG. 7.

Figure 4:
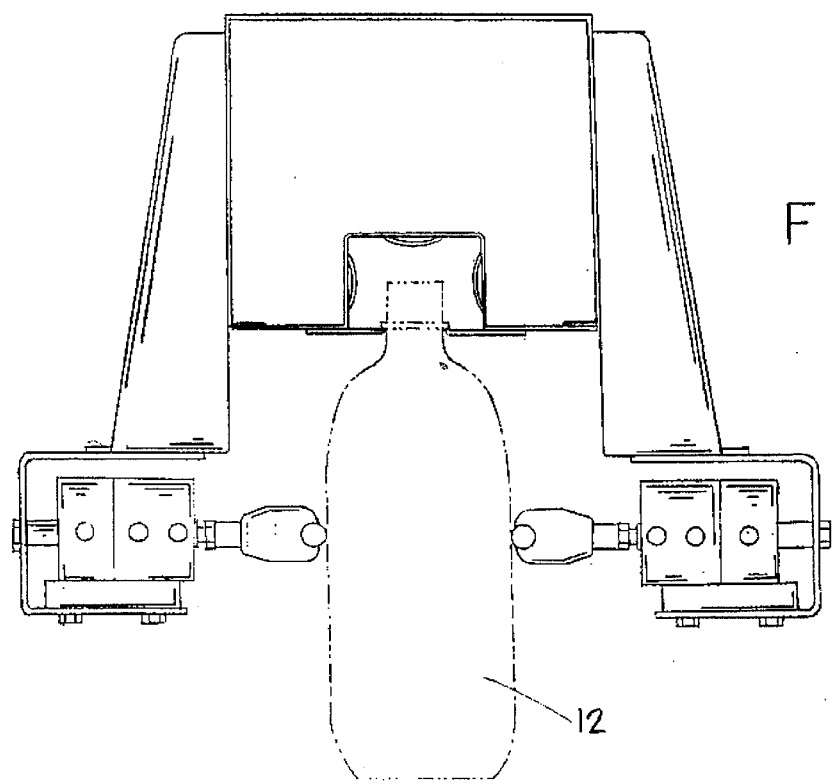
Figure 8:
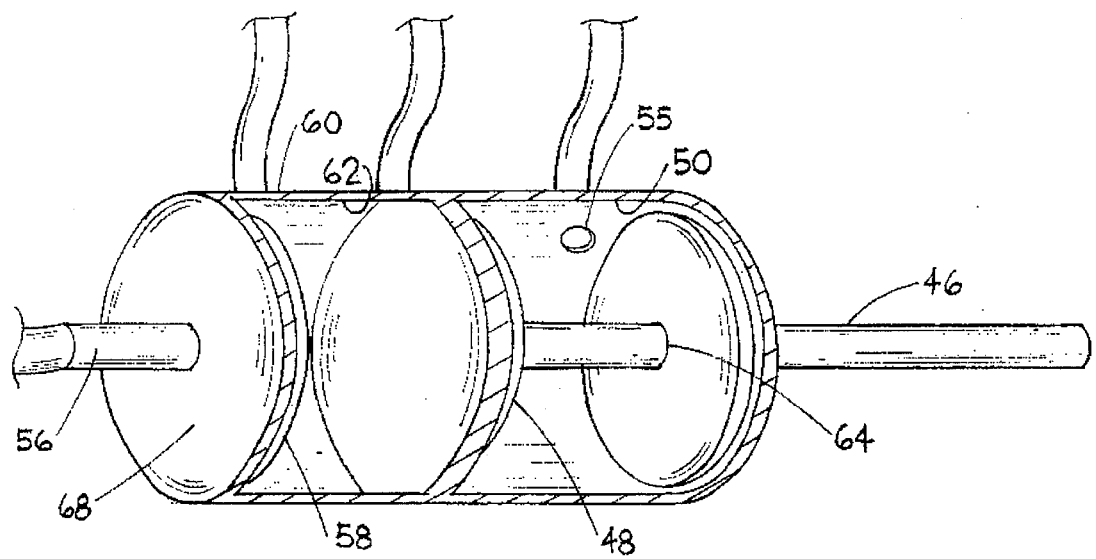

In feeding the next largest bottle, reference is had to FIGS. 4 and 8. In such situation, the air has been provided to the side of the second piston remote from the bottle to move the second piston toward the bottle. This brings the guide rails together to a limited extent.

Figure 9:
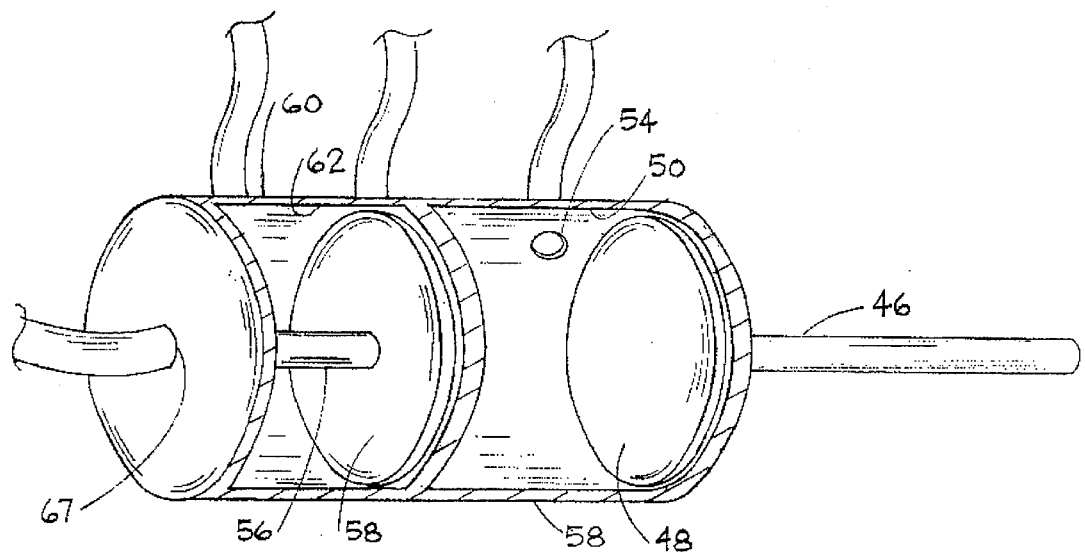

FIGS. 5 and 9 illustrate the blocks moved away from the bottle and its path of travel with pressurized air moved to the side of the first piston remote from the bottle and its path of travel. This moves these guide rails inwardly to a greater extent.

Figure 10:
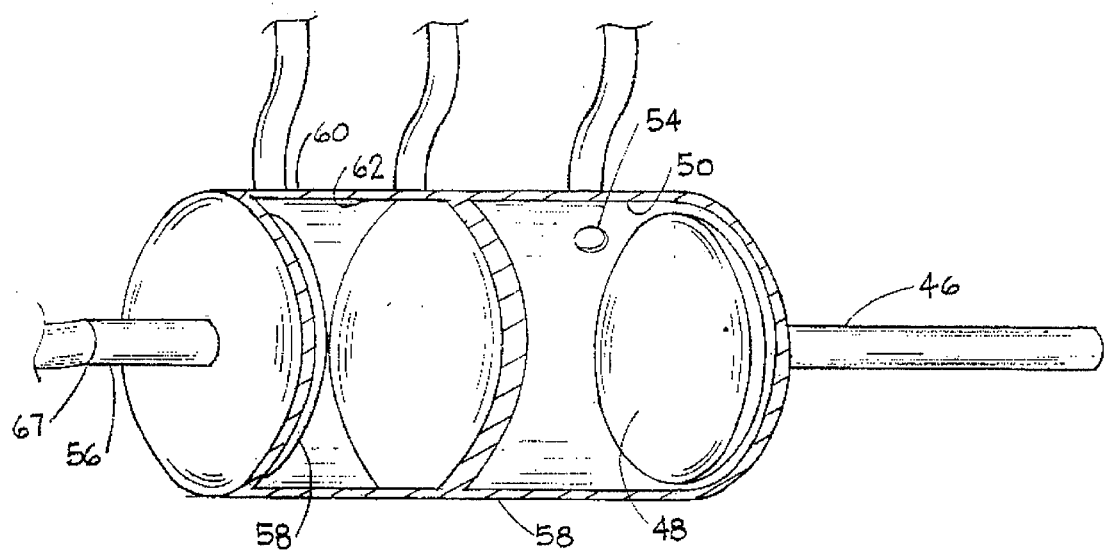

FIGS. 6 and 10 are illustrations showing the guide rails together to the greatest extent for feeding the smallest of bottles. In such situation, air is supplied to the first block on the side thereof remote from the bottle and its path of travel while pressurized air is fed to the second block on the side thereof adjacent to the bottle to move the blocks away from the fixed end. Consequently, the rails are moved towards each other to the greatest extent.

Figure 11:
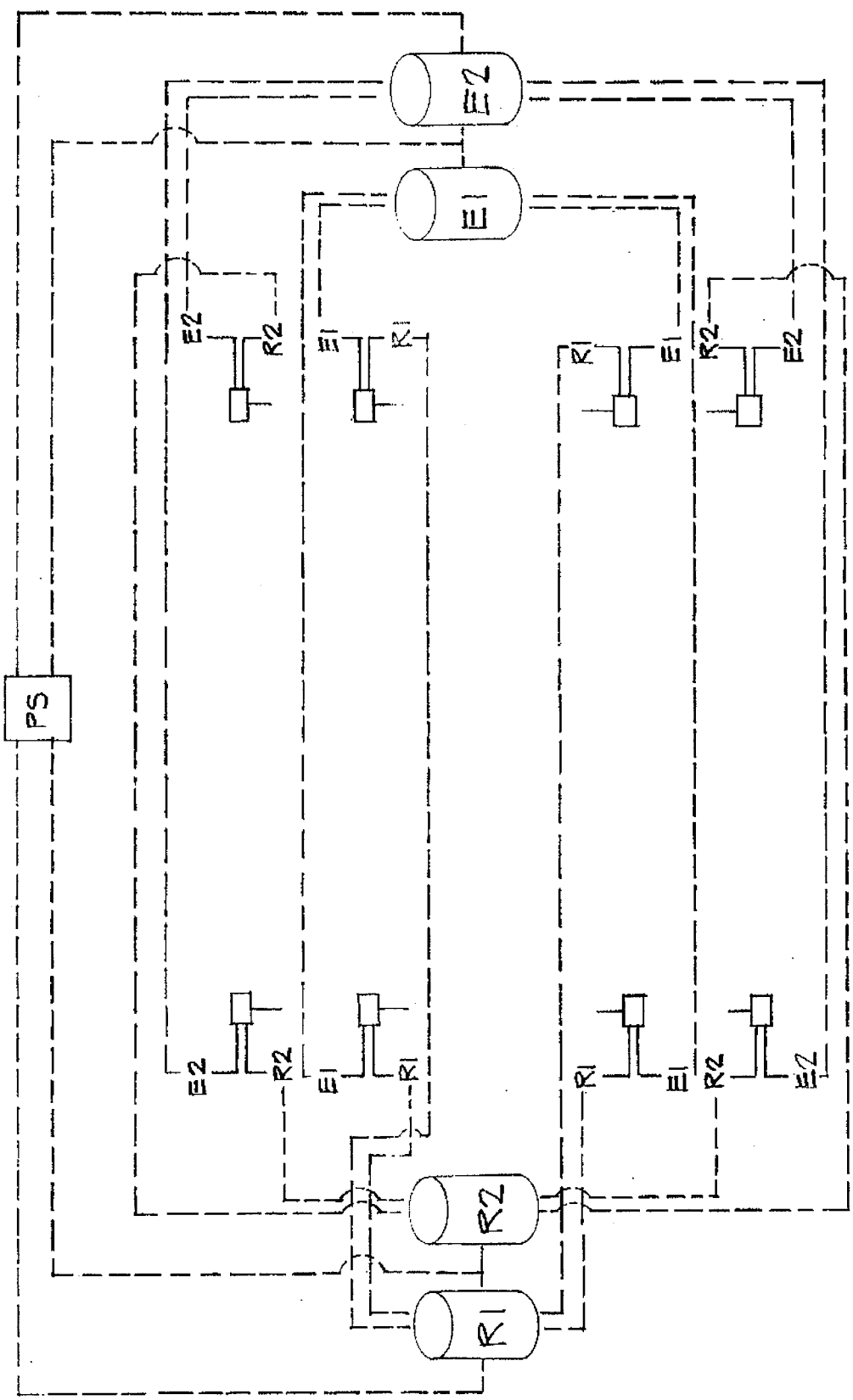
FIG. 11 is a schematic illustration of the controls for the pistons shown mechanically in the prior Figures.

Lastly, FIG. 11 is a schematic illustration of the blocks for receiving air to effect movement of the associated pistons and, consequently, the side rails. In this showing two pistons R1 and R2 are on one side of the bottle and two pistons E1 and E2 are shown on opposite sides of the bottle for concurrent movement with respect to each other. Also shown are the various ports into which pressurized air may be fed from a source of pressure PS in order to effect the appropriate shifting of the piston and movement of the side rails. A common micro-processor, not shown, is provided to activate and inactivate the appropriate valves E2, R2, E1, R1, etc., for correlating the feeding of air to the various locations within the blocks.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A multi-position bottle guide assembly for bottles suspended by a neck ring and conveyed by pneumatic power comprising:

a pair of elongated guide rails positioned along the path of travel of a bottle being pneumatically conveyed while supported by a neck ring, the rails adapted to be in proximity to the sides of the bottle on opposite sides of its path of travel to preclude lateral movement;

a plurality of support means attached to at least one of the rails;

a plurality of first rods, each first rod having coupling means at a first end thereof for attaching the first rod to one of the support means and having a first piston at a second end thereof;

a first block for each first rod having a first bore of a diameter essentially that of the diameter of the first piston and extending through the first block with its axis in alignment with the axis of the first rod;

a pair of axially spaced first pneumatic ports extending through the first block in a direction perpendicular to the first bore and radially with respect to the first rod and on opposite sides of the first piston such that one of the first ports is closer to the at least one rail than the other first port, whereby when pressurized air is introduced through the first port which is closer to the at least one rail, the first piston moves the at least one rail outwardly with respect to the path of travel of the bottle to accommodate larger bottles and, when pressurized air is introduced into the first port which is farther from the at least one rail, the first piston moves the at least one rail inwardly with respect to the path of travel of the bottle to accommodate smaller bottles;

a plurality of second rods, each second rod having a fixed first end and a second piston at its second end;

a second block coupled to each first block on the side thereof remote from the at least one rail and having a second bore of a diameter essentially that of the diameter of the second piston and extending through the second block with its axis in alignment with the axis of the second rod; and a pair of axially spaced second pneumatic ports extending through each second block, at least one in a direction perpendicular to the second bore and radially with respect to the second piston and on opposite sides of the second piston such that one of the second ports is closer to the at least one rail than the other second port, whereby, when pressurized air is fed in through the second port which is farther from the at least one rail, the second block moves away from the fixed first end of the second rod, thereby moving the at least one rail inwardly with respect to the path of travel of the bottle to accommodate smaller bottles and when pressurized air is introduced into the second port which is closer to the at least one rail, the second block moves toward the fixed first end of the second rod, thereby moving the at least one rail outwardly with respect to the path of travel of the bottle to accommodate larger bottles.

2. The apparatus as set forth in claim 1 and further including:

a source of pressurized air for the pairs of ports with a valve for each port adapted to be controlled by a common microprocessor.

* * * * *